Jan. 13, 1959     W. G. ANNABLE ET AL     2,868,524
CONTACTING APPARATUS
Filed Oct. 5, 1956

INVENTORS.
WELDON G. ANNABLE
BY WILLIAM L. JACOBS

Edward H Lang
ATTORNEY

United States Patent Office 2,868,524
Patented Jan. 13, 1959

2,868,524

CONTACTING APPARATUS

Weldon G. Annable, Mundelein, and William L. Jacobs, Crystal Lake, Ill., assignors to The Pure Oil Company, Chicago, Ill., a corporation of Ohio Application October 5, 1956, Serial No. 614,130

2 Claims. (Cl. 261—111)

This invention relates to apparatus for mixing or contacting liquids and gases or vapors one with another. In accordance with this invention, the gaseous phase being handled may be soluble or insoluble in the liquid phase, or may be reactable therewith. The liquid phase may be a mixture of two or more materials including liquids, liquids and finely divided solids, or liquids and gaseous media. The invention encompasses a system for bringing a liquid into contact with a gas for any desired purpose and relates more particularly to the use of fog-forming means for injecting liquid into contact with vapors for various physical and/or chemical transformations of the mixture so produced.

A great many expedients have been used in the prior art to obtain intimate contact between liquids and vapors, including sprays or jet-producing nozzles, falling streams or sheets of liquid, two-phase mixing nozzles within bubble cap towers employing disengagers, downcomers, accumulating trays and various means for recycling and recontacting the liquids and vapors in one or more zones of a tower. Some prior art methods are dependent upon the passage of a stream of one liquid into the path of a stream of another liquid to form a combined stream which is divided into two streams and injecting the two streams as opposed jets into each other at pressure drops up to 20 pounds per square inch whereby only certain nozzle spacings are available to give the desired intimate contact. In practice it is often difficult to adjust the nozzle spacings and flow rates to obtain the highest degree of dispersion and contact. As far as we are aware, these prior art devices provide for only relatively small liquid surface areas to be exposed to the vaporous or gaseous phase or are not concerned with liquid-gas dispersions. In using small liquid surface areas, control of the reaction or physical transformations is poor. We have devised an apparatus or reactor in which these shortcomings are overcome and very intimate contact is obtained through the use of fogging-nozzles in one or more zones of an elongated reactor, and located within the vapor or gas path between said zones.

The accompanying drawings may be referred to to show one embodiment of the invention. In the drawings, Figure 1 is a vertical cross-sectional view of a liquid-vapor contactor showing the internal structure of various zones, Figure 2 is a cross-section of the contactor taken along lines 2—2 of Figure 1, Figure 3 shows one form of fogging apparatus that may be used.

Referring to the drawings, in which identical parts bear the same numerals, contactor 10 is provided with tubular or cylindrical wall 12, having dome-shaped top 14 and bottom 16, attached thereto by means of bolted flange-pairs 18—20 and 22—24, respectively. The vapor or gas inlet is shown at 26 and the outlet at 28, these conduits being similarly attached. The inside length of wall 12 is divided into a number of treating or contacting zones which are designated at 30, 32 and 34, and numerals 36 and 38 designate the vapor inlet or distributing zone and the accumulating or outlet zone, respectively. These zones are defined by the spaced relationship of bubble trays 40, 42 and 44, with suitable bubble-caps 46, 48 and 50 attached by means of brackets 52, 54 and 56 to vapor passageways 58, 60 and 62. The bubble trays are held in position by suitable brackets indicated at 64, 66 and 68, of which a plurality are used for each tray as necessary.

Similarly positioned and spaced throughout column, or contactor, 10 are liquid take-off or accumulator trays 70, 72 and 74 which are attached within tubular wall 12 by means of brackets 76, 78 and 80. Each liquid take-off tray is provided with vertical vapor passageways or ports 82, 84 and 86. Between adjacent bubble trays and liquid take-off trays are positioned fog-nozzles 88, 90 and 92 having their lower fog outlets pointing against the vapor passageway of the liquid take-off tray immediately below same, and their upper outlets pointing into the vapor passageway of the bubble-cap located immediately above same. This is shown in the drawing by the relative positions of fog areas 94, 96 and 98, shown in dotted lines in conical-shaped patterns. A series of downcomers, 100, 102 and 104, is provided, each supported by the bubble tray and positioned on one side thereof. The upper ends of the downcomers maintain the liquid levels on the bubble trays at least as high as the lower edges of the bubble caps so that the liquid fog particles passing through ports 58—62 must also pass through the liquid layers so maintained. This is shown by liquid-level line 105 in zone 38. The lower ends of the downcomers terminate within the liquid layers maintained on the adjacent liquid take-off trays.

It is to be understood that any number of contact or reactor zones 36—38 may be used and the invention is not to be limited to the number of zones shown in the drawings. Also, any type of fog-producing elements or nozzles may be used which produce liquid particles having diameters less than 0.5 millimeter, that is in the order of 0.1 to 0.01 millimeter or less. The particles of liquid produced are so small that under normal conditions they would not coalesce or condense. Liquid particles of this small size are produced by using pressures at the nozzle outlets of at least 100 p. s. i. g. and preferably about 350 p. s. i. g. or higher. The pressures employed are considerably higher than those commonly used in prior art sprays or atomization nozzles.

The apparatus is equipped with various conduits, valves and pumps to introduce and remove liquid and vapors from the various zones. Charge liquid is introduced via line 110, moved by pump 112 operated by motor 114 through line 116, controlled by valve 118, into fog nozzle 92 within zone 34, or the lowest zone of the contactor. Portions of the charge liquid may be conducted into an adjacent upper zone or any succeeding upper zone as by line 120, controlled by valve 122 and communicating with line 124, leading to fog-nozzle 90 within zone 32. Line 126, controlled by valve 128, is provided to recycle recovered or transformed liquid from line 130, within zone 30 to lower zone 32. Line 130 may be used to withdraw liquid from liquid accumulator tray 70, and is controlled by valve 132. Zone 34 is connected with line 134, controlled by valve 136. Branch line 138, controlled by valve 140, connects to line 124 to fog-nozzle 90, and is fitted with pump 142, operated by motor 144, serving to convey portions of liquid from tray 74 to zone 32. A similar arrangement is provided between zones 30 and 32 by means of line 146, controlled by valve 148, branch line 150, valve 152, pump 154 and motor 156.

The invention may be illustrated by its utilization in the purification of a hydrocarbon gas stream. A well gas comprising $C_1$–$C_4$ hydrocarbons and containing contaminating amounts of hydrogen sulfide and water is introduced in line 26 at the rate of about 300,000 cu. ft./day. Treating solution, comprising a mixture of 30 vol. percent triethanolamine and 70 vol. percent diethylene glycol, to remove the hydrogen sulfide and water from the gas, is introduced by line 110 and pump 112 into fog-nozzles 90 and 92 at a rate of about 12 gal. min. The pressure within the various zones is maintained at about 300 p. s. i. g. and the treating solution is forced through the nozzles at a pressure of about 500–600 p. s. i. g. The temperature of the absorber is about 120° F. The fine mist from the fog nozzles permits intimate contact between the treating solution and the gas stream passing from zone to zone through ports 86, 62, 84, 60, 82 and 58. The result is 99.9% removal of the hydrogen sulfide and complete dehydration of the gas stream. Treating solution drawn off at line 134 is sent to a regenerator (not shown in the drawing) operated at 215° F. and atmospheric pressure, wherein hydrogen sulfide and water are stripped out. The regenerated triethanol-amine-diethylene glycol solution may be returned to the apparatus to keep the amount of make-up solution needed to a minimum.

The invention and apparatus may be applied to any gas-liquid or vapor-liquid contact process such as the treatment of well gases to remove impurities, to remove particular hydrocarbons; the treatment of refinery gases to purify same or remove desirable constituents; the purification or washing of air; the chlorination of hydrocarbons; drying of hydrocarbons with diethylene glycol; solvent extraction processes wherein the material to be treated is a gas or may be vaporized; chemical reactions wherein one reactant is a gas or vapor and the other is a liquid. In all instances it is intended that the liquid phase reactant or agent be sent through the fog nozzles and the gas or vapor enter the reactor at line 26.

The fog nozzles may be any form of fog-producing device which is capable of disintegrating a liquid into very fine droplets, less than 0.5 millimeter in diameter and preferably in the order of 0.1 to 0.01 millimeter in diameter. A simplified form of fog nozzle is shown in Figure 3 which is a cross-sectional view showing block 160 having inlet 162 and outlets 164 and 166, same being conical in shape. Conical outlets 164 and 166 communicate with inlet 162 at their apexes forming pocket 168. A fog control means comprising cones 170 and 172 is located within pocket 168. Cone 170 has threaded stem 174 which screws within the hollow stem 176 of cone 172. The top surfaces of cones 170 and 172 may have slots therein (not shown) into which is fitted a suitable tool for adjusting the distances between the cone surfaces and walls of inlets 164 and 166. During use liquid is forced under pressure into inlet 162 and passes between the outer cone surfaces and the outlet walls in the form of a fog. The pressures necessary for this purpose will vary with the viscosity of the liquid to be fogged. For liquids having viscosities of that of water, like alcohols, esters, ethers, alkanolamines, etc., pressures in the order of 100–350 p. s. i. g. may be sufficient. For more viscous liquids, higher pressures in the order of 500 p. s. i. g. are used. Another arrangement that may be used to produce a fog is that described in United States Patent 2,410,215 by H. G. Houghton employing opposed jet nozzles which divide the liquid into two streams and force them directly into one another at high pressures. By using laminar flow wherein the Reynolds number is less than about 2,300 the drop size of the fog particles will be quite uniform, according to Houghton, but by use of opposing jets Reynolds numbers between 20,000 to 600,000 may be attained with uniform and extremely small drop size being obtained. At 50 p. s. i. g. the nominal diameter of the drops will be in the order of 50 microns or .05 mm. using opposed jets. It is contemplated that the fog sprays 88, 90, and 92 shown in the drawings may be replaced by the opposed jets of Houghton. It is preferred that the pressure drop between the fog device and the contact zone be in the order of 200–300 p. s. i. g. in order to assure adequate dispersion and uniform drop size under both laminar and turbulent flow conditions from the fog device regardless of the Reynolds number attained.

What is claimed is:

1. A liquid-vapor contacting apparatus comprising in combination, a vertically elongated tubular column having a vapor inlet and a vapor outlet at its lower and upper ends respectively, a plurality of contact zones located along the length of said column providing a continuous vapor flow path therein, each of said contact zones comprising an upper bubble cap tray and a lower liquid accumulator tray, a downcomer connected between each bubble cap tray and liquid accumulator tray so as to have its open ends immersed in the liquid levels confined thereby, each of said bubble cap and liquid accumulator tray having their spaced vapor ports in alignment with each other, means for introducing a liquid into each of said contact zones in the form of a non-coalescing fog whereby the particle size of the fog droplets is in the order of 0.1 to 0.01 millimeter in diameter, said fog-producing means operating at a pressure of at least 100 p. s. i. g. above the vapor pressure in each zone, and said fog-producing means being located between each pair of trays defining a contact zone in a position opposite the entrance and exit, respectively, of the vapor ports of the bubble cap tray and the liquid accumulator tray in such a manner that the fog is directed upwardly and downwardly to encompass the openings of said spaced vapor ports.

2. A liquid-vapor contacting apparatus comprising in combination, a vertically elongated tubular column having a lower vapor inlet and an upper vapor outlet, a plurality of contact zones located along the length of said column providing a central vapor flow path therein, each of said contact zones consisting of an upper bubble cap tray and a lower liquid accumulator tray positioned transverse the longitudinal axis of the column, a downcomer connected through each bubble cap tray at one side of the column, the top of each downcomer extending above the bubble cap tray to define a liquid level thereabove, the bottom of each downcomer being spaced from the adjacent liquid accumulator tray, centrally located vapor ports in said bubble cap trays, centrally located vapor ports in said liquid accumulator trays, all of said vapor ports being in substantially vertical alignment, means for introducing a liquid into each of said contact zones in the form of a non-coalescing fog having a particle size diameter of about 0.1 to 0.01 mm. at a pressure of at least 100 p. s. i. g. above the vapor pressure of each zone, each of said fog-producing means adapted to direct one zone of fog upwardly toward the bottom opening of the vapor port of the upper bubble cap tray and a second zone of fog downwardly toward the top opening of the vapor port of the lower liquid accumulator tray, conduit means to convey liquid to said means for producing fog in each contact zone and conduit means for removing liquid phase from above each bubble cap tray and liquid accumulator tray.

References Cited in the file of this patent

UNITED STATES PATENTS

| | | |
|---|---|---|
| 1,783,901 | Bottoms | Dec. 2, 1930 |
| 2,177,068 | Hutchinson | Oct. 24, 1939 |
| 2,620,895 | Turner | Dec. 9, 1952 |
| 2,733,054 | Van Ackeren | Jan. 31, 1956 |
| 2,753,949 | Manuel | July 10, 1956 |